(12) United States Patent
Svensson et al.

(10) Patent No.: US 10,137,867 B2
(45) Date of Patent: Nov. 27, 2018

(54) VEHICLE LOW PRESSURE BRAKE ARRANGEMENT

(71) Applicants: Christian Svensson, Vårgårda (SE); Dan Bråse, Vårgårda (SE); Erik Rydsmo, Sollebrunn (SE); Jan-Erik Källhammer, Linköping (SE)

(72) Inventors: Christian Svensson, Vårgårda (SE); Dan Bråse, Vårgårda (SE); Erik Rydsmo, Sollebrunn (SE); Jan-Erik Källhammer, Linköping (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/305,567

(22) PCT Filed: Apr. 21, 2015

(86) PCT No.: PCT/SE2015/050452
§ 371 (c)(1),
(2) Date: Oct. 20, 2016

(87) PCT Pub. No.: WO2015/163812
PCT Pub. Date: Oct. 29, 2015

(65) Prior Publication Data
US 2017/0036651 A1 Feb. 9, 2017

(30) Foreign Application Priority Data
Apr. 24, 2014 (SE) .................................. 1450487

(51) Int. Cl.
*B60T 1/14* (2006.01)
(52) U.S. Cl.
CPC ..................... *B60T 1/14* (2013.01)
(58) Field of Classification Search
CPC .......................................................... B60T 1/14
USPC ..................................................... 188/5, 4 R
See application file for complete search history.

(56) References Cited

U.S. PATENT DOCUMENTS

| 1,698,482 | A | * | 1/1929 | Nicin | ..................... B60B 39/00 |
| | | | | | 104/155 |
| 3,167,154 | A | * | 1/1965 | Salvetti | ..................... B60T 1/14 |
| | | | | | 188/5 |

(Continued)

FOREIGN PATENT DOCUMENTS

| CN | 201224399 Y | 4/2009 |
| DE | 102011012966 A1 | 9/2012 |

(Continued)

OTHER PUBLICATIONS

International Search Report and Written Opinion of the ISA for PCT/SE2015/050452, ISA/SE, Stockholm, dated Aug. 20, 2015.

*Primary Examiner* — Thomas J Williams
*Assistant Examiner* — Mariano Sy
(74) *Attorney, Agent, or Firm* — Stephen T. Olson; Harness, Dickey & Pierce, P.L.C.

(57) ABSTRACT

A vehicle braking arrangement includes a braking plate connected to a vehicle by a link arm. The braking plate is movable from a rest position to a braking position where contact is made with the ground, and includes a sealing rim arranged to at least partially contact the ground such that an at least partly enclosed volume is formed. The vehicle braking arrangement includes an expandable chamber formed between a lower plate, at least one connecting side wall and an upper plate, which chamber is connectable to the volume. Upon activation, the chamber's volume is expanded by movement of the lower plate away from the upper plate. Then the pressure is lowered in the volume which results in that the braking plate is pressed against the ground. In this way, a retaining force is obtained.

13 Claims, 10 Drawing Sheets

SECTION A-A

(56) References Cited

U.S. PATENT DOCUMENTS

| | | | | |
|---|---|---|---|---|
| 3,209,849 | A | * | 10/1965 | Gondert ............ B62D 49/0621 |
| | | | | 180/164 |
| 3,730,300 | A | * | 5/1973 | Scherenberg ............ B60T 1/14 |
| | | | | 180/271 |
| 3,892,287 | A | * | 7/1975 | Bennett .................... B60V 1/00 |
| | | | | 114/296 |
| 4,044,862 | A | * | 8/1977 | Savarimuthu ............ B60T 1/14 |
| | | | | 180/164 |
| 4,193,469 | A | * | 3/1980 | Graf ........................ B60B 39/00 |
| | | | | 180/164 |
| 4,317,507 | A | * | 3/1982 | McMillan ................. B60T 1/14 |
| | | | | 188/2 R |
| 7,237,828 | B2 | * | 7/2007 | Frederick ............. B62D 21/155 |
| | | | | 180/276 |
| 8,356,685 | B2 | | 1/2013 | Baumann |
| 8,656,685 | B2 | | 2/2014 | Wu |
| 9,656,638 | B2 | | 5/2017 | Rydsmo et al. |
| 2006/0202452 | A1 | * | 9/2006 | Breed ................... B60R 21/214 |
| | | | | 280/730.2 |
| 2009/0001693 | A1 | * | 1/2009 | Tavares Da Silva Vinhas ............ |
| | | | | B60R 21/239 |
| | | | | 280/728.3 |
| 2016/0052493 | A1 | | 2/2016 | Rydsmo et al. |
| 2017/0008497 | A1 | | 1/2017 | Svensson et al. |

FOREIGN PATENT DOCUMENTS

| | | | |
|---|---|---|---|
| EP | 2311695 | A1 | 4/2011 |
| WO | WO-2014168529 | A1 | 10/2014 |

* cited by examiner

SECTION A-A

SECTION A-A

SECTION A-A

SECTION A-A

VEHICLE LOW PRESSURE BRAKE ARRANGEMENT

CROSS-REFERENCE TO RELATED APPLICATIONS

This application is a 371 U.S. National Stage of International Application No. PCT/SE2015/050452, filed Apr. 21, 2015, which claims the benefit of and priority to Swedish Patent Application No. 145048702, filed Apr. 24, 2014. The disclosures of the above applications are incorporated herein by reference.

FIELD

Description of the Invention

The present invention relates to a vehicle braking arrangement comprising a braking plate and a connecting arrangement adapted to connect the braking plate to a vehicle. The braking plate is the part of the vehicle braking arrangement that will be pressed against the ground in order to generate a retaining force. The braking plate is movable from a rest position with a certain ground clearance to a braking position where contact is made with the ground. The braking plate further comprises a sealing rim running circumferentially and being arranged to at least partially contact the ground in the braking position, such that an at least partly enclosed volume then is formed between the braking plate and the ground.

BACKGROUND

In many traffic situations it is desired to acquire an enhanced braking effect, for example at possible collision situations and when the road grip is lost. One way to achieve an enhanced braking effect is described in EP 2311695, where a braking mat is pressed against the road by at least one airbag in a chamber, where the chamber may evacuated in order to obtain a larger pressure from said airbag. This arrangement only relies on the effect of braking friction forces due to pressure from the braking mat against the road.

Another similar arrangement is described in U.S. Pat. No. 8,356,685, where a braking plate may be lowered. When lowered, a vacuum chamber of the plate faces the road, the vacuum chamber being evacuated such that a retaining function is obtained by the plate being pressed against the road due to the lowered pressure in the vacuum chamber. The lowered pressure is obtained by means of a gas generator acting on a so-called Venturi tube.

However, for such an arrangement, it is likely that the time between activation of the braking plate and the evacuation is too long for acquiring a braking effect in time. It is also likely that the pressure fall will be insufficient for obtaining a suitable braking effect whatsoever.

SUMMARY

It is therefore an object of the present invention to provide an enhanced emergency braking arrangement where a braking plate may be lowered to the road and where a volume formed between the plate and the road may be subject to a lowered pressure such that the plate is pressed towards the road. In particular, an effective and reliable evacuation of the volume is desired.

Said object is achieved by means of a vehicle braking arrangement comprising a braking plate and a connecting arrangement adapted to connect the braking plate to a vehicle. The braking plate is movable from a rest position with a certain ground clearance to a braking position where contact is made with the ground. The braking plate further comprises a sealing rim running circumferentially and being arranged to at least partially contact the ground in the braking position, such that an at least partly enclosed volume then is formed between the braking plate and the ground.

The vehicle braking arrangement further comprises an expandable chamber formed between a lower plate, at least one connecting side wall and an upper plate. The expandable chamber is at least fluidly connectable to the at least partly enclosed volume. When the braking plate is taking the braking position, the volume of the expandable chamber is arranged to expand, from a first volume to a second volume, by means of the lower plate being moved away from the upper plate such that the air pressure in the expandable chamber initially falls below the air pressure of ambient air. When the braking plate reaches the braking position, the expandable chamber is fluidly connected to the at least partly enclosed volume such that the pressure is lowered in the at least partly enclosed volume by means of the lowered pressure in expandable chamber. This results in that the braking plate is pressed against the ground by a conferred pressure difference between air outside the at least partly enclosed volume and air in the at least partly enclosed volume such that a retaining force between the braking plate and the ground is obtained.

According to an example, the expandable chamber is fluidly connected to the at least partly enclosed volume via a venting arrangement that is arranged to be opened when the braking plate reaches the braking position.

For example, the venting arrangement may be constituted by a valve assembly or a breakable membrane.

According to another example, said side wall of the expandable chamber is at least partly comprised by an endless circumferentially running tubular airbag that is arranged to be inflated when the expandable chamber is intended to expand. The lower plate is constituted by the braking plate, the inflating airbag resulting in that the braking plate and the upper plate are separated such that the volume of the expandable chamber increases.

According to another example, said side wall of the expandable chamber is at least partly comprised by a cylinder inner wall, and the lower plate is constituted by a piston. When the expandable chamber is intended to expand, the piston is arranged to move such that the piston and the upper plate are separated, such that the volume of the chamber increases.

The piston may for example be arranged to be displaced by means of a spring.

According to another example, the valve assembly comprises a trigger pin, at least one locking pin, a piston and a housing, the piston being co-axially arranged in the housing. The housing comprises at least one aperture that connects the low pressure container to the interior of the housing. The piston is locked in sealing engagement with the housing by said locking pin. The trigger pin is arranged to release the piston by acting on said locking pin when the trigger pin is pressed against the ground, the released piston allowing a fluid connection between the volume and the low pressure container to be established.

According to another example, at least one of the chamber and the at least partly enclosed volume is connected to a supporting arrangement for maintaining a low pressure when the chamber has been expanded. The supporting arrangement may for example comprise at least one of:

at least one low pressure container;
an existing low pressure source in the vehicle; and
a pyrotechnical charge acting on a Venturi tube.

Other examples are evident from the dependent claims.

A number of advantages are obtained by means of the present invention. Mainly, the volume formed between the plate and the road may be subject to a lowered pressure and may be evacuated more efficiently than described previously.

BRIEF DESCRIPTION OF THE DRAWINGS

The present invention will now be described more in detail with reference to the appended drawings, where.

DETAILED DESCRIPTION

Figure 1:
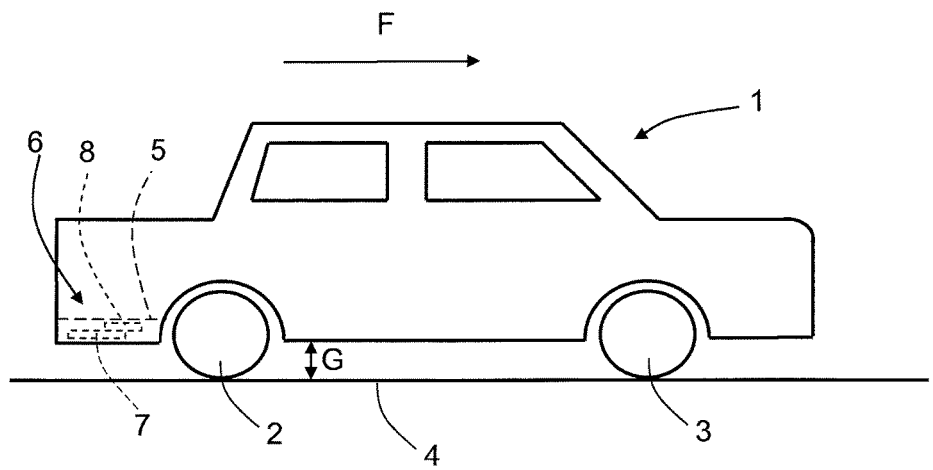
FIG. 1 shows a schematic side view of a vehicle during normal running.

With reference to FIG. 1, showing a side view of a vehicle 1, where the vehicle 1 comprises wheels 2, 3 which are in contact with the ground 4 during normal running. Here, the vehicle 1 is assumed to be running in a forward direction F. At the rear of the vehicle 1, attached to a bottom floor 5, an emergency braking system 6 is arranged and is shown in its rest position.

Figure 2:
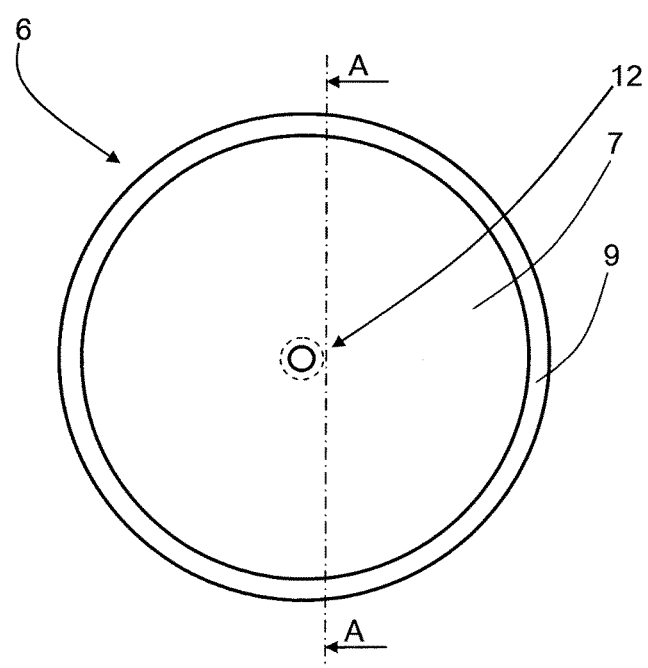
FIG. 2 shows a bottom view of a vehicle braking arrangement according to the present invention.

FIG. 2 shows a bottom view of the emergency braking system 6, where the emergency braking system 6 comprises a braking plate which in turn comprises a sealing rim 9, running circumferentially and being arranged to provide a sealing between the braking plate 7 and the ground when the braking plate 7 is in its braking position. The emergency braking system 6 comprises a valve assembly 12 with a trigger pin 13, which parts will be described more in detail later. There is a section A-A in FIG. 2, which will be used for different embodiments and different states in FIG. 4, FIG. 7, FIG. 13 and FIG. 14.

Figure 3:
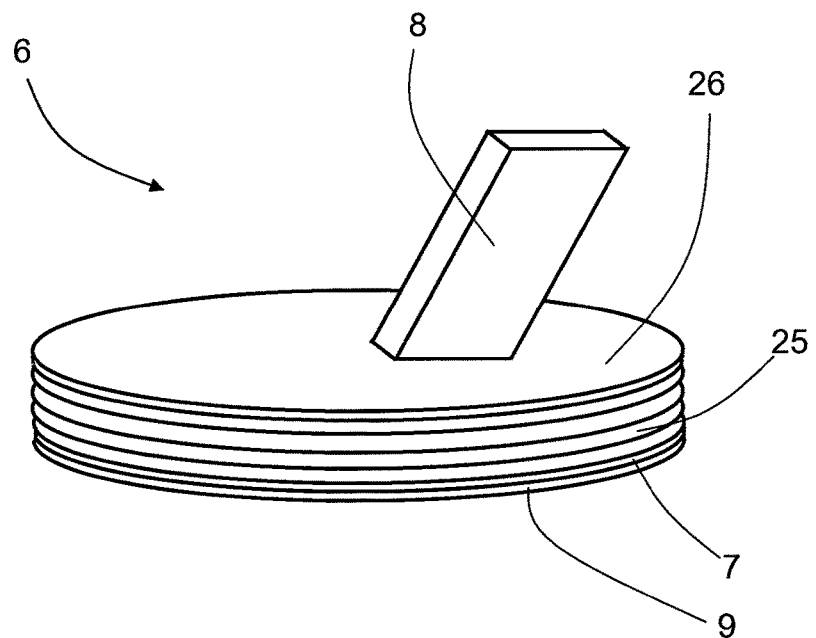
FIG. 3 shows a perspective view of a first example of the vehicle braking arrangement in its rest position.

FIG. 3 shows a top side view of a first example of the emergency braking system 6 in its rest position, and with reference also to FIG. 1, the emergency braking system 6 comprises an upper plate 26 that is connected to the bottom floor 5 by means of a link arm 8. As shown in FIG. 1, the braking plate is maintained in a rest position during normal running conditions, more or less obscured by the outer body of the vehicle 1, and preferably arranged to not disturb the vehicle's normal ground clearance G.

Figure 4:
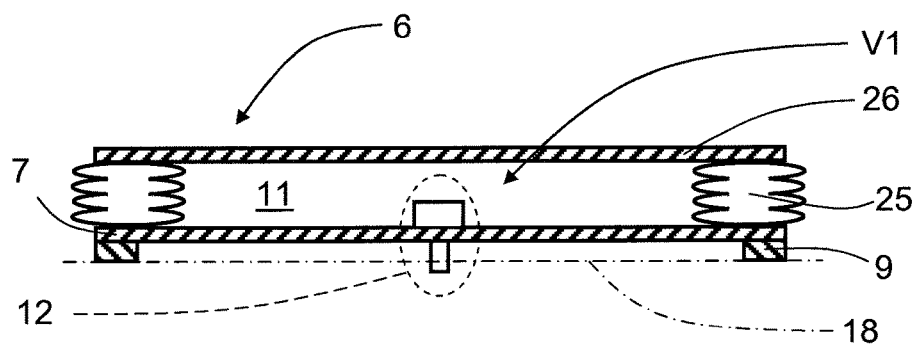
FIG. 4 shows a sectional side view of the first example of the vehicle braking arrangement in its rest position.

FIG. 4 shows a sectional view of FIG. 2 with the emergency braking system 6 in its rest position. The link arm 8 is not within the section A-A of FIG. 2, and therefore not shown.

Figure 5:
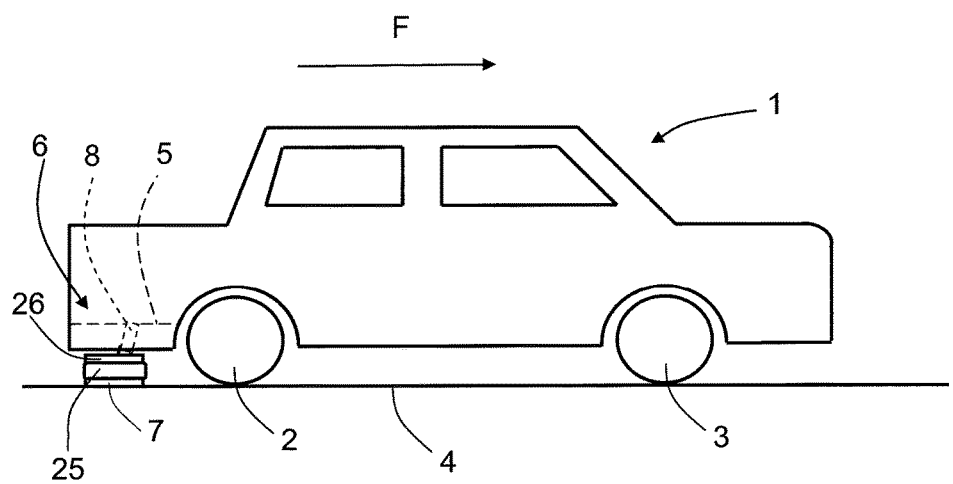
FIG. 5 shows a schematic side view of a vehicle with the first example of the vehicle braking arrangement in braking position.
Figure 6:
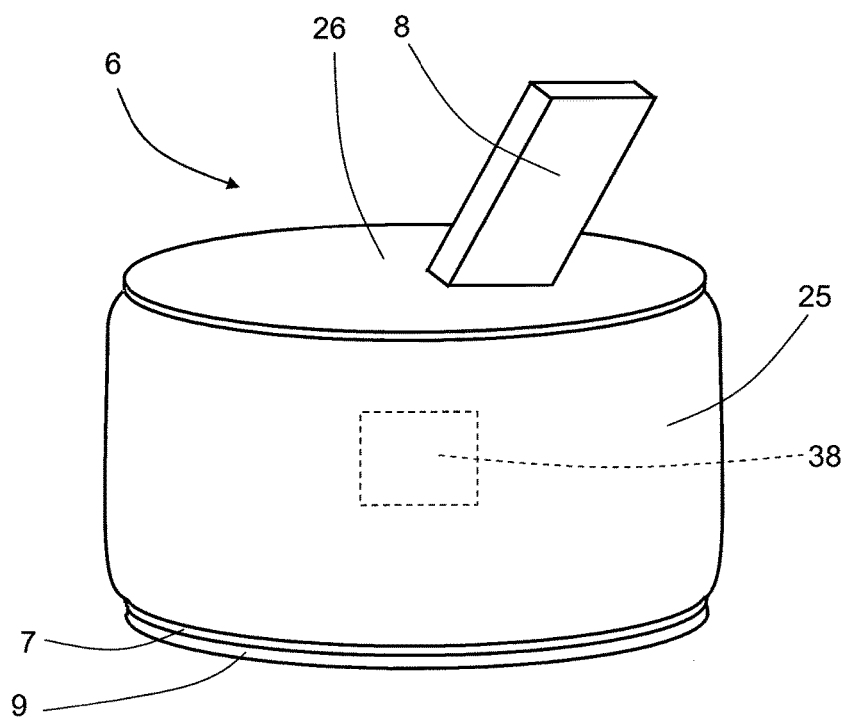
FIG. 6 shows a perspective view of the first example of the vehicle braking arrangement in braking position.
Figure 7:
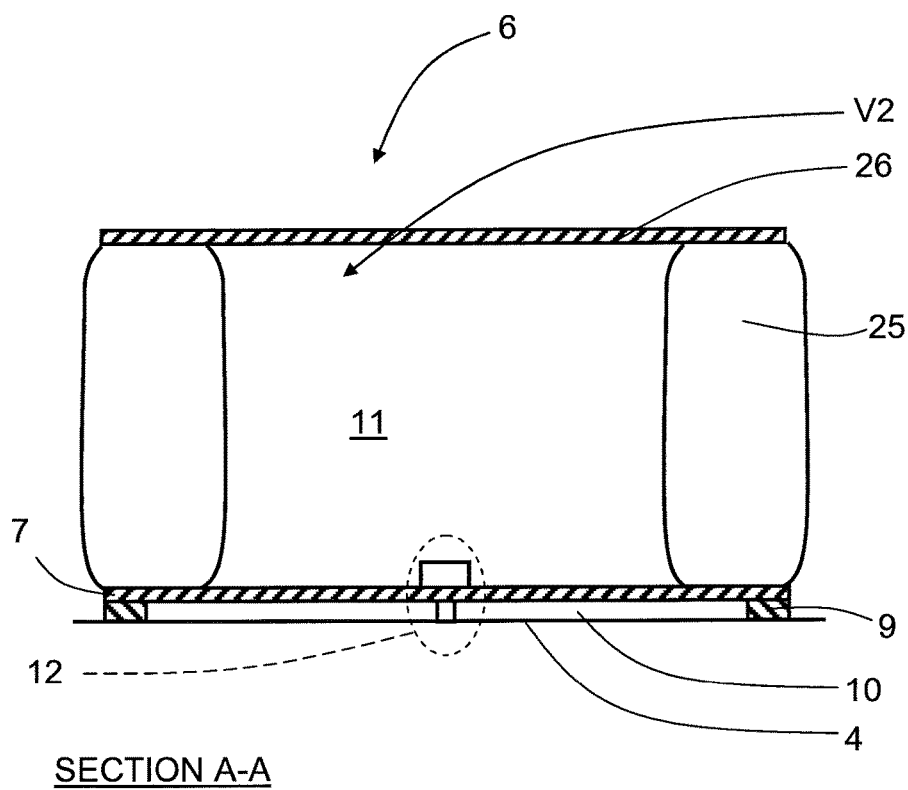
FIG. 7 shows a sectional side view of the first example of the vehicle braking arrangement in braking position.

With reference to FIG. 5, FIG. 6 and FIG. 7, an emergency situation has been detected, and additional braking is required. FIG. 5, FIG. 6 and FIG. 7 correspond to FIG. 1, FIG. 3 and FIG. 4, but here the emergency braking system 6 is shown with the braking plate 7 in the braking position. The braking plate 7 has here rapidly been displaced to a braking position where the sealing rim 9 of the braking plate 7 is in contact with the ground 4.

As mentioned previously, FIG. 4 shows a sectional view of FIG. 2 with the emergency braking system 6 in its rest position, and FIG. 7 shows a sectional view of FIG. 2 with the emergency braking system 6 in its braking position. Here, it is shown that a volume 10 is formed between the braking plate 7, the sealing rim 9 and the ground 4 when the braking plate is in the braking position. In FIG. 4, a plane 18 is indicated which corresponds to the position of the ground when the braking plate is in the braking position. The volume 10 may not be completely enclosed due to leakage in the sealing rim 9, for example due to unevenesses in the surface of the ground 4, thus constituting an at least partly enclosed volume 10. Furthermore, the braking plate and the upper plate 26 are connected by an endless circumferentially running tubular airbag 25.

According to the present invention, with reference to FIG. 4 and FIG. 7, the emergency braking system 6 comprises an expandable chamber 11 formed between the braking plate 7, the tubular airbag 25 and an upper plate 26. The chamber 11 is fluidly connected to the volume 10 via the valve assembly 12. The volume of the chamber 11 is arranged to expand when the braking plate 7 is taking the braking position by being moved away from the upper plate 26 such that the air pressure in the chamber initially falls below the air pressure of ambient air. When the braking plate 7 reaches the braking position, the valve assembly 12 is arranged to be opened such that the pressure is lowered in the volume 10 by means of the lowered pressure in the chamber. This results in that the braking plate 7 is pressed against the ground 4 by a conferred pressure difference between air outside the volume 10 and air in the volume 10, such that a retaining force between the braking plate 7 and the ground 4 is obtained.

In this example, the expandable chamber 11 is expanded by the braking plate 7 being moved away from the upper plate 26. This is achieved by means of the tubular airbag 25 that is arranged to be inflated when the expandable chamber 11 is intended to expand. As shown in FIG. 6 and FIG. 7, the inflated airbag 25 results in that the braking plate 7 and the upper plate 26 are separated such that the volume of the chamber 11, being an expandable volume, increases from a first volume V1 to a second volume V2.

A sufficiently low pressure may be maintained up to a number of seconds, during which a braking effect is achieved.

Figure 8:
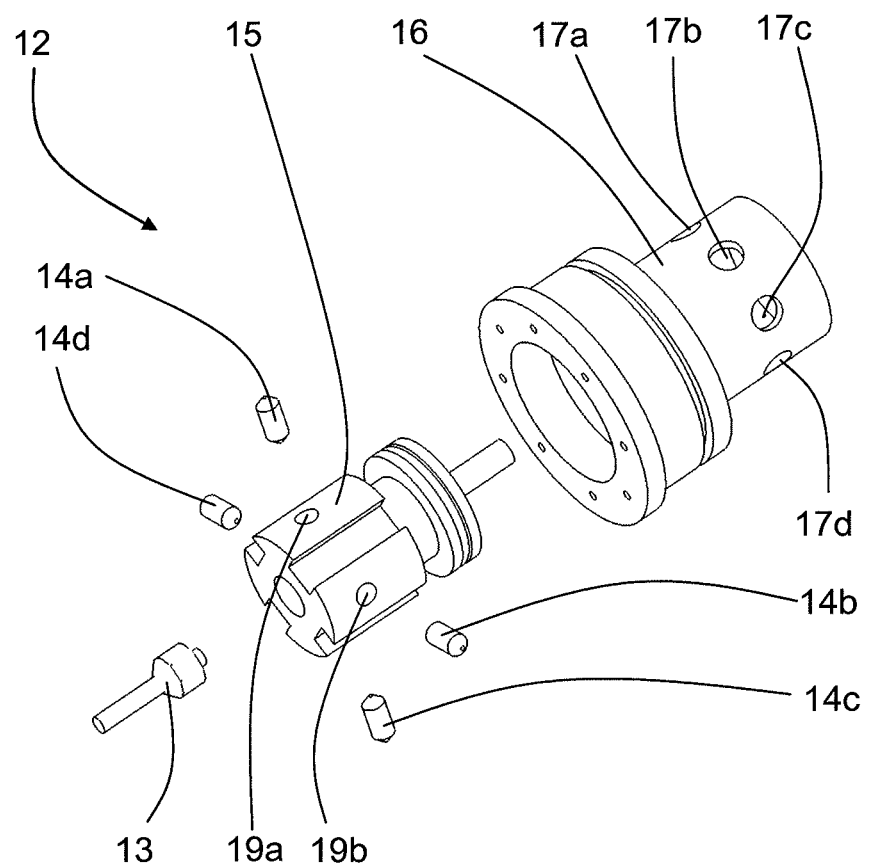
FIG. 8 shows an exploded view of the valve assembly.
Figure 9:
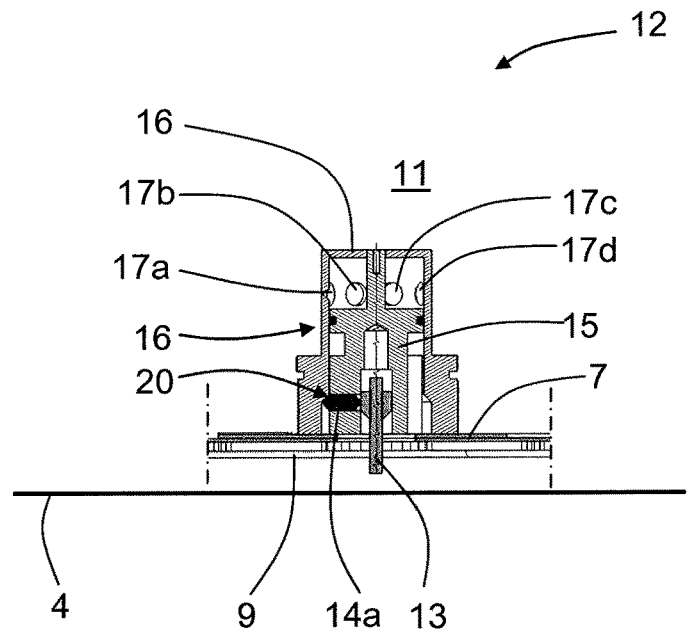
FIG. 9 shows a sectional side view of the of the vehicle braking arrangement a moment before meeting the ground.
Figure 10:
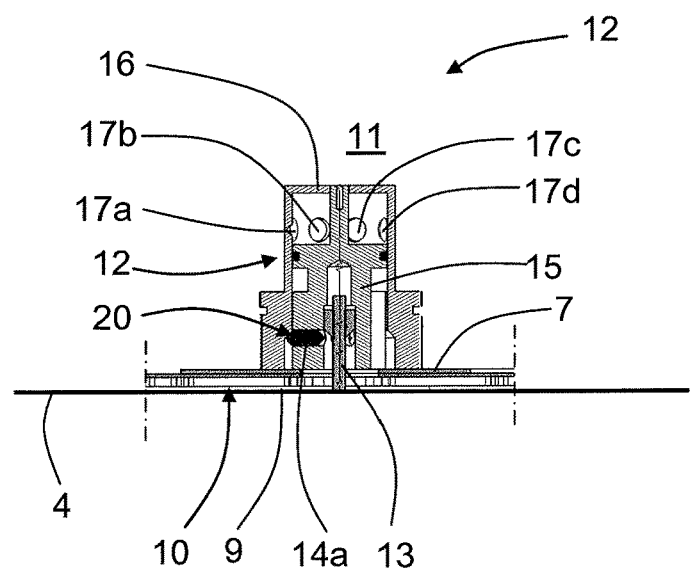
FIG. 10 shows a sectional side view of the vehicle braking arrangement at the moment the braking plate meets the ground.
Figure 11:
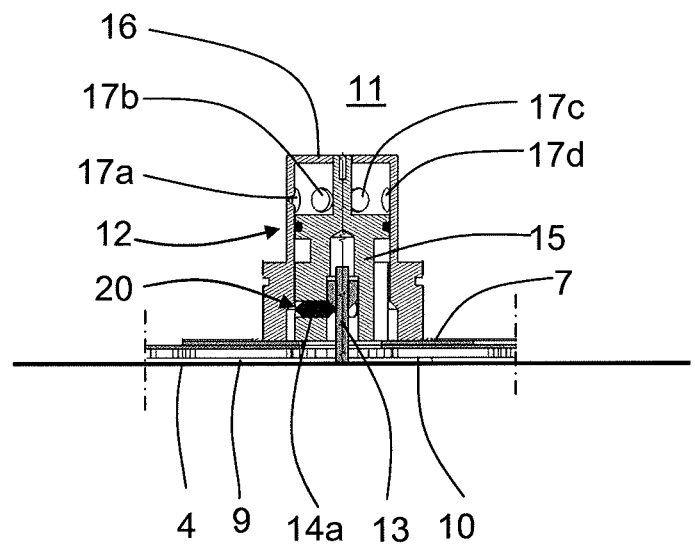
FIG. 11 shows a sectional side view of the vehicle braking arrangement when the piston is unlocked.
Figure 12:
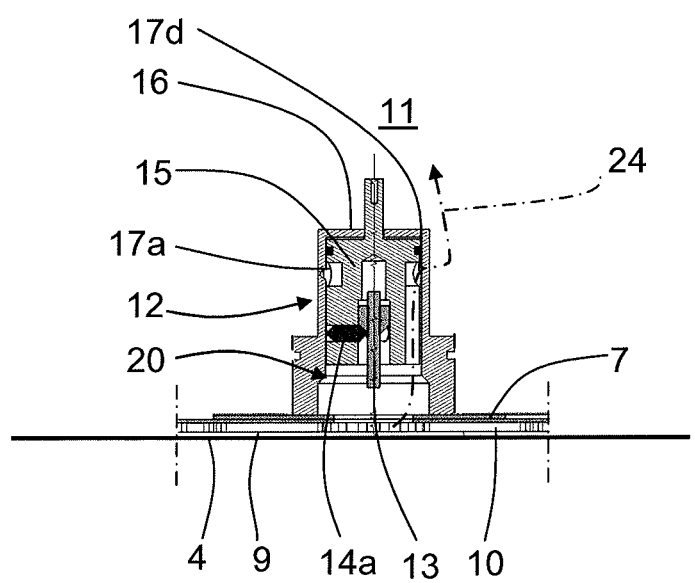
FIG. 12 shows a sectional side view of the vehicle braking arrangement when the valve assembly is opened.

In the following, a more detailed description of the valve assembly 12 is provided with reference to FIG. 8, FIG. 9, FIG. 10 FIG. 11, and FIG. 12, where FIG. 8 shows an exploded view of the valve assembly 12, FIG. 9 shows a sectional side view of the emergency braking system 6 a moment before the braking plate 7 meets the ground 4, FIG. 10 shows a sectional side view of the emergency braking system 6 at the moment the braking plate 7 meets the ground 4, FIG. 11 shows a sectional side view of the emergency braking system 6 when the piston is unlocked, and FIG. 12 shows a sectional side view of the emergency braking system 6 when the valve assembly is opened. In these Figures, only the central part of the braking plate 7 is shown, for reasons of clarity.

As shown in FIG. 8 and FIG. 9, the valve assembly 12 constitutes an interface between the volume 10 and the expandable chamber 11. The valve assembly 12 comprises a trigger pin 13, four locking pins 14a, 14b, 14c, 14d, a piston 15 and a housing 16, the piston 15 being co-axially arranged in the housing 16. The housing 16 comprises circumferentially arranged apertures 17a, 17b, 17c, 17d that connect the expandable chamber 11 to the interior of the housing 16.

At this moment, as described in FIG. 9, the trigger pin 13 blocks the locking pins 14a, 14b, 14c, 14d, the piston 15 being in sealing engagement with the housing 16. The locking pins 14a, 14b, 14c, 14d lock the piston 15 to the housing 16 in an axial direction, the locking pins 14a, 14b, 14c, 14d running in corresponding apertures 19a, 19b (only two of four shown in FIG. 8) in the piston 15, and arranged to be locking against a circumferentially running shoulder edge 20 in the housing 16.

In FIG. 10, the braking plate 7 has reached the ground 4, and the trigger pin 13 has been pressed against the ground depressed into the piston 15. In this position, the locking pins 14a, 14b, 14c, 14d are not locked by the trigger pin 13 anymore, but remain in their position at this instant.

In FIG. 11, due to the pressure in the expandable chamber 11 falling below the pressure in the volume 10, the piston 15 is urged towards the expandable chamber 11. Due to wedges in the locking pins 14a, 14b, 14c, 14d, and the wedged shape of the shoulder edge 20, the locking pins 14a, 14b, 14c, 14d are pushed away from the housing 16, into the apertures 19a, 19b in the cylinder 15, by means of the cylinder's movement, the locking pins 14a, 14b, 14c, 14d no longer being blocked by the trigger pin 13. This means that the initial movement of the cylinder 15 performs an unlocking of the cylinder 15 itself relative the housing 16. The piston 15 may also be urged towards the expandable chamber 11 by means of a pre-tensioned spring when released by the locking pins 14a, 14b, 14c, 14d.

As shown in FIG. 12, the cylinder 15 has moved to such a position that there now is a fluid connection from the volume 10 to the expandable chamber 11, air now being evacuated from the volume 10 to the expandable chamber 11 via the apertures 17a, 17b, 17c, 17d, for example as indicated with a dash-dotted air flow arrow 24. As an effect of this, the pressure in the volume 10 is lowered relative the air surrounding the braking plate 7, the braking plate 7 being pressed towards the ground 4. The retaining force is dependent of the magnitude of pressure drop, which in its turn is dependent on of the sealing properties of the sealing rim 9 and the capacity of the low pressure generation.

The steps above with reference to FIG. 9, FIG. 10, FIG. 11 and FIG. 12 are performed very rapidly, roughly within 100 milliseconds.

By means of this arrangement, a secure and almost instant opening of the valve assembly 12 when the braking plate 7 hits the ground 4 is obtained. Due to the relative short time of braking effect, the timing of when opening the valve assembly 12 is critical for the function of the brake.

Other types of valve arrangements are of course conceivable, the one described only being an example. For example, a pyrotechnical charge may be arranged to open a valve element when the braking plate 7 hits the ground 4.

Figure 13:
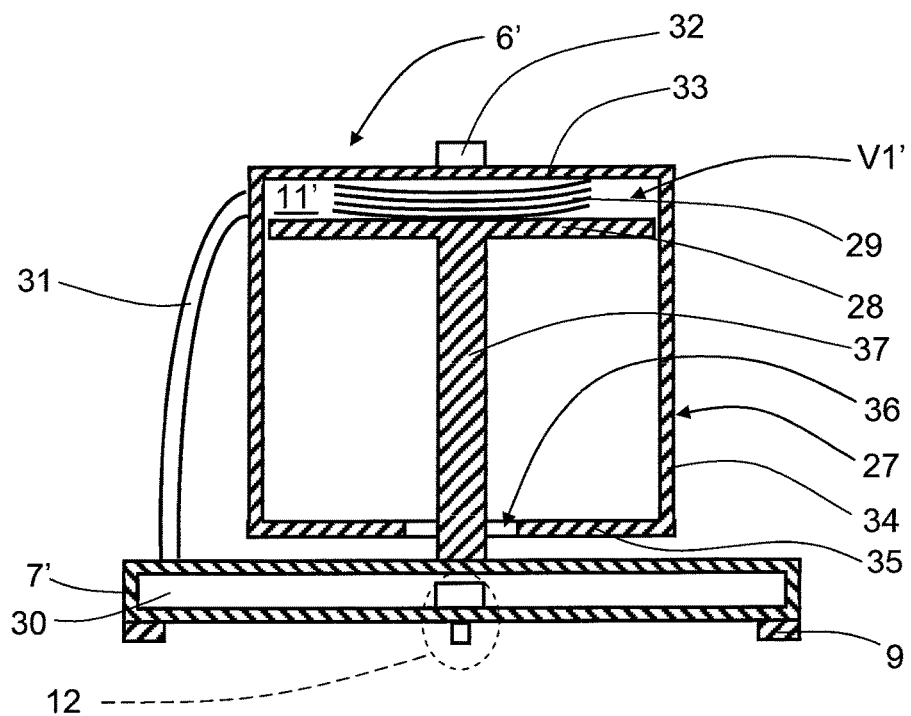
FIG. 13 shows a sectional side view of a second example of the vehicle braking arrangement in its rest position.
Figure 14:
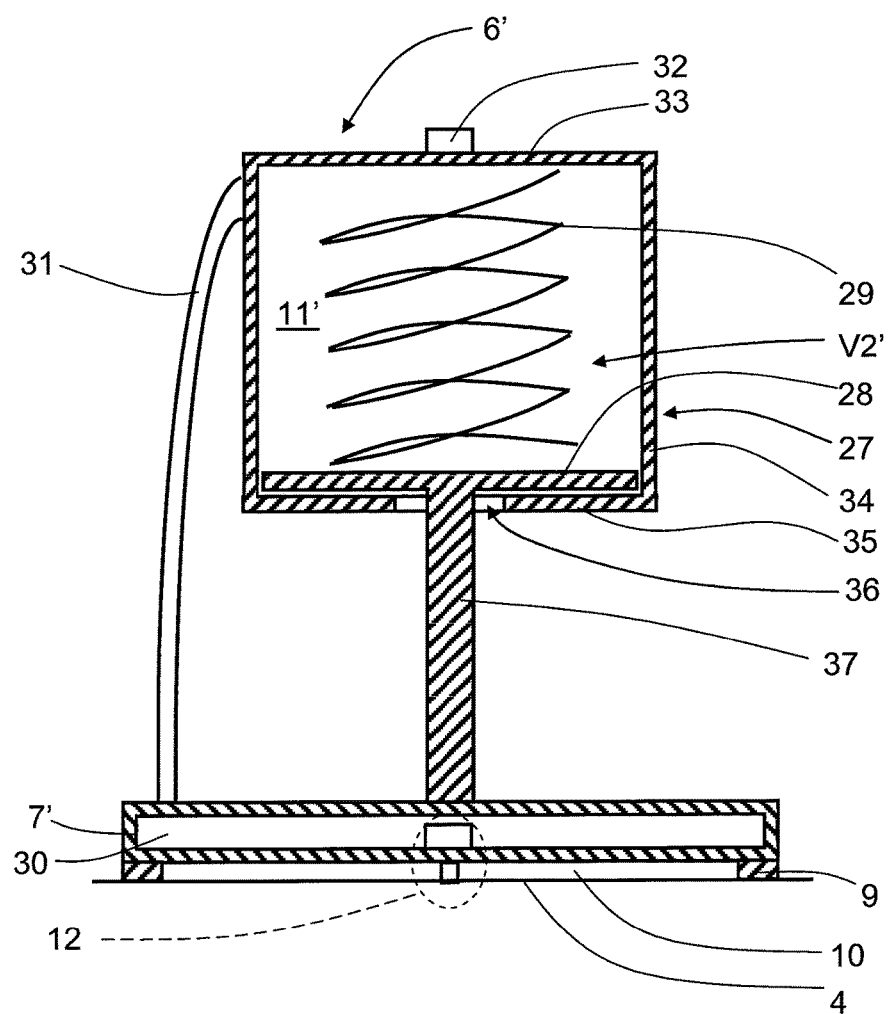
FIG. 14 shows a sectional side view of the second example of the vehicle braking arrangement in braking position.

FIG. 13 shows a sectional side view of a second example of an emergency braking system 6' a moment before the braking plate 7' meets the ground 4 and FIG. 14 shows a sectional side view of said emergency braking system 6' at the moment the braking plate 7' meets the ground 4.

As shown in FIG. 13, an expandable chamber 11' is formed in a rigid container 27 in which a piston 28 is movably arranged, being pre-tensioned in a first position by a spring 29, which is schematically indicated. The piston 28 is connected to the braking plate 7' by means of a connecting rod 37.

The expandable volume of the chamber is arranged to increase from a first volume V1' to a second volume V2'. The rigid container 27 comprises an upper plate 33, a bottom wall 35 and enclosing walls 34, which here are shown as formed in one piece, although they may be formed by two or more separate pieces. The bottom wall 35 comprises at least one aperture 36 allowing movement of the piston 28 in the rigid container 27 and allowing air to escape during movement of the piston 28.

In the piston's 28 first position, the first volume V1' is a small part of the total available volume of the container 27, allowing room for the spring 29. The braking plate 7' is connected to the piston 28 and comprises a plate volume 30 that is in fluid connection with the expandable chamber 11' by means of a tube 31, hose, pipe or similar that may be expandable if initially not being of sufficient length. The valve assembly 12 is of the same kind as discussed previously, and constitutes an interface between the volume 10 and the expandable chamber 11', via the plate volume 30 and the tube 31.

The emergency braking system 6' also comprises a trigger device 32 that is arranged to release the piston 28 when emergency braking is considered needed.

In FIG. 14 the spring has been released, and the piston has been displaced together with the braking plate 7' such that the braking plate 7' has reached the ground 4 which in turn results in that the valve assembly 12 has been opened. The expandable volume of the expandable chamber has here been expanded to the second volume V2', such that the pressure is lowered in the expandable chamber 11'. The lowered pressure in the chamber 11' also lowers the pressure in the volume 10 via the tube 31, the plate volume 30 and the valve assembly 12. As in the first example, this results in that the braking plate 7 is pressed against the ground 4 by a conferred pressure difference between air outside the volume 10 and air in the volume 10, such that a retaining force between the braking plate 7 and the ground 4 is obtained.

In this second example, there is also the possibility of a telescopic arrangement, where the piston is connected to a further spring-loaded rod that is connected to the braking plate 7'. In this way, the length of the braking plate's movement may be extended.

Figure 15:
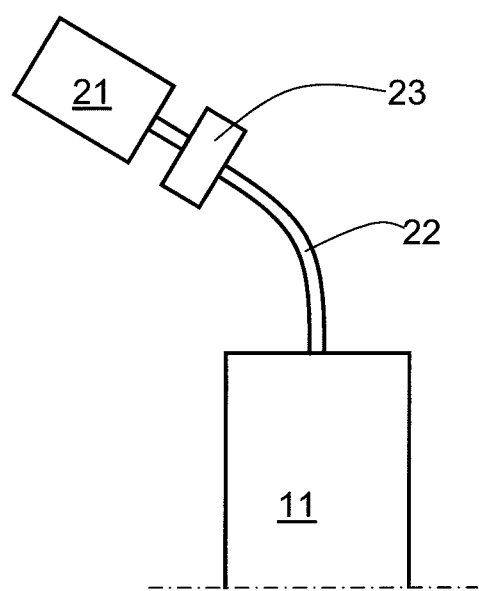
FIG. 15 shows a schematical view of a supporting arrangement connected to a chamber via a valve.

Furthermore, with reference to FIG. 15, the expandable chamber 11, here being only partially and schematically indicated, may alternatively be connected to a supporting arrangement 21 for maintaining a low pressure after an at least partial pressurization of the expandable chamber 11. The expandable chamber 11 is connected to the supporting arrangement 21 by means of a pipe 22, hose or similar, via a suitable valve arrangement 23. The supporting arrangement 21 is only shown schematically as a box, and may be constituted in a number of ways. A number of examples follow below.

A supporting arrangement 21 may be constituted by one or several low pressure containers which suitably are connected one at a time or in any other suitable previously configured manner. One or several valves are used for such an arrangement, said valve being controlled by for example pressure levels and/or electrical signals. Another example of a supporting arrangement 21 is an existing low pressure source in the vehicle, suitably a device such as a vacuum pump or the engine's intake system. The use of an existing low pressure source in the vehicle requires that the low pressure source is connected to the expandable volume 11 via a valve arrangement 23 that suitably is in the form of a one-way valve. When the engine's intake system is used as a low pressure source, a valve or similar is used to re-direct the engine's intake system from ambient air to the expandable volume 11.

Yet another example is a pyrotechnical charge that is adapted to create a low pressure, suitably by acting on a so-called Venturi tube.

A combination of the several supporting arrangements according to the above is also conceivable. The supporting arrangement or supporting arrangements may alternatively be directly connected to the at least partially enclosed volume 10 or, where applicable, the plate volume 30.

The invention is not limited to the examples above, but may vary freely within the scope of the appended claims. For example, the expandable chamber may be expanded in many other ways, for example by means of a piston that is driven by a pyrotechnical charge.

The emergency braking system 6 is generally constituted by a vehicle braking arrangement.

The link arm 8 may be movably attached and spring-loaded such that it is arranged to turn such that the braking plate 7 is moved towards the ground 4, as shown in FIG. 1 and FIG. 5. However, the link arm 8 may alternatively be attached in an unmoving manner, such that all moment of the braking plate 7 towards the ground 4 is performed by means of the expanding chamber 11.

In the first example as shown in FIG. 3-FIG. 7, the braking plate 7 also constitutes the lower plate, and in the second example, the lower plate is formed by the piston 28.

Instead of the valve assembly, generally constituting a venting arrangement, other types of venting arrangements are possible. For example, such a venting arrangement may be in the form of a membrane that is broken when the braking plate 7, 7' reaches the braking position.

The valve assembly 12 does not have to be present; it is also conceivable to have a braking plate without any such device. The expandable chamber 11, 11' is then directly connected to the at least partly enclosed volume 10, not via a valve. This means that the expandable chamber 11, 11' is at least fluidly connectable to the at least partly enclosed volume 10.

The link arm 8 is only an example, any type of connecting arrangement may be used to connect the braking plate 7, 7' to the vehicle 1.

With renewed reference to FIG. 6, in the example where a tubular airbag 25 is used to expand the volume 11, the airbag may comprise an airbag venting arrangement 38 (only schematically indicated in FIG. 6) that is used to create a passage between the interior of the airbag 25 and ambient air, allowing the raised pressure in the airbag 25 to be lowered, when at least one predetermined condition is fulfilled, after inflation of the airbag 25 has been initiated. Such a predetermined condition may for example relate to an elapsed time or when a certain pressure in the airbag 25 has been reached.

By means of such an airbag venting arrangement 38, the braking arrangement 6 becomes more flexible. Such an airbag venting arrangement 38 may either be of a passive kind or an active kind. As an example of a passive venting arrangement, a membrane may be adapted to be opened when the interior pressure of the airbag 25 exceeds a certain value.

Active venting arrangements may for example comprise a connection to the valve arrangement 12 which is arranged to open an openable aperture in the airbag 25 when the valve arrangement is opened, or a pyrotechnical charge that is arranged to open the airbag 25 at a certain moment. A further example is a wire that opens an openable aperture in the airbag 25 when the airbag 25 has reached a certain degree of expansion.

What is claimed is:

1. A vehicle braking arrangement comprising:
   a braking plate including a sealing rim running circumferentially adapted to at least partially contact the ground in a braking position such that an at least partly enclosed volume then is formed between the braking plate and the ground, the braking plate movable to the braking position from a rest position;
   an expandable chamber at least fluidly connectable to the at least partly enclosed volume and where, when the braking plate is in the braking position, a volume of the expandable chamber is arranged to expand, from a first volume to a second volume such that air pressure in the expandable chamber initially falls below an air pressure of ambient air, such that, when the expandable chamber is fluidly connected to the at least partly enclosed volume, the pressure is lowered in the at least partly enclosed volume as a result of a lowered pressure in the expandable chamber, which results in pressing of the braking plate against the ground by a conferred pressure difference between air outside the at least partly enclosed volume and air in the at least partly enclosed volume such that a retaining force between the braking plate and the ground is obtained; and
   a valve assembly fluidly connecting the expandable chamber and the at least partly enclosed volume, the valve assembly including a trigger pin, at least one locking pin, a piston and a housing, the piston being co-axially arranged in the housing, the housing includes at least one aperture that connects the expandable chamber to an interior of the housing, the piston being locked in sealing engagement with the housing by the locking pin, the trigger pin being arranged to release the piston by acting on the locking pin when the trigger pin is pressed against the ground, the piston when released allowing a fluid connection between the enclosed volume and the expandable chamber to be established.

2. The vehicle braking arrangement according to claim 1, wherein the expandable chamber is fluidly connected to the at least partly enclosed volume via a venting arrangement, the venting arrangement arranged to be opened when the braking plate reaches the braking position.

3. The vehicle braking arrangement according to claim 2, wherein the venting arrangement includes a breakable membrane.

4. The vehicle braking arrangement according to claim 1, wherein the expandable chamber is formed between the brake plate, a side wall and an upper plate, the side wall of the expandable chamber at least partly includes an endless circumferentially running tubular airbag that is arranged to be inflated when the expandable chamber is intended to expand, the airbag resulting in that the braking plate and the upper plate are separated such that the volume of the expandable chamber increases from the first volume to the second volume.

5. The vehicle braking arrangement according to claim 4, wherein the tubular airbag includes an airbag venting arrangement that is adapted to create a passage between an interior of the tubular airbag and ambient air, allowing a raised pressure in the tubular airbag to be lowered, when at least one predetermined condition has been fulfilled after inflation of the tubular airbag has been initiated.

6. The vehicle braking arrangement according to claim 1, wherein the expandable chamber is formed between a lower plate, a side wall and an upper plate, the side wall of the expandable chamber is at least partly comprised by a cylinder inner wall, wherein the lower plate is constituted by a piston, wherein the piston is arranged to move such that the piston and the upper plate are separated, such that the volume of the chamber increases from the first volume to the second volume.

7. The vehicle braking arrangement according to claim 6, wherein the piston is arranged to be displaced by a spring.

8. The vehicle braking arrangement according to claim 6, wherein the braking plate is connected to the piston and includes a plate volume that is in fluid connection with the expandable chamber, where the plate volume is connectable to the at least partly enclosed volume by means of the valve assembly.

9. The vehicle braking arrangement according to claim 1, wherein at least one of the chambers and the at least partly enclosed volume is connected to a supporting arrangement for maintaining a low pressure when the chamber has been expanded.

10. The vehicle braking arrangement according to claim 9, wherein the supporting arrangement comprises at least one of:
at least one low pressure container;
an existing low pressure source in the vehicle; and
a pyrotechnical charge acting on a Venturi tube.

11. The vehicle braking arrangement according to claim 10, wherein the existing low pressure source in the vehicle comprises an engine's air intake which is re-directable from ambient air to at least one of the chamber and the at least partly enclosed volume.

12. The vehicle braking arrangement according to claim 1 in combination with a vehicle.

13. A vehicle braking arrangement comprising:
a braking plate including a sealing rim running circumferentially adapted to at least partially contact the ground in a braking position such that an at least partly enclosed volume then is formed between the braking plate and the ground, the braking plate movable to the braking position from a rest position;
an expandable chamber at least fluidly connectable to the at least partly enclosed volume and where, when the braking plate is in the braking position, a volume of the expandable chamber is arranged to expand, from a first volume to a second volume such that air pressure in the expandable chamber initially falls below an air pressure of ambient air, such that, when the expandable chamber is fluidly connected to the at least partly enclosed volume, the pressure is lowered in the at least partly enclosed volume as a result of a lowered pressure in expandable chamber, which results in pressing of the braking plate against the ground by a pressure difference between air outside the at least partly enclosed volume and air in the at least partly enclosed volume such that a retaining force between the braking plate and the ground is obtained,
wherein a first side of the expandable chamber is connected to the braking plate and a second side of the expandable chamber carries a link arm for movable attachment to a chassis of the vehicle.

* * * * *